UNITED STATES PATENT OFFICE.

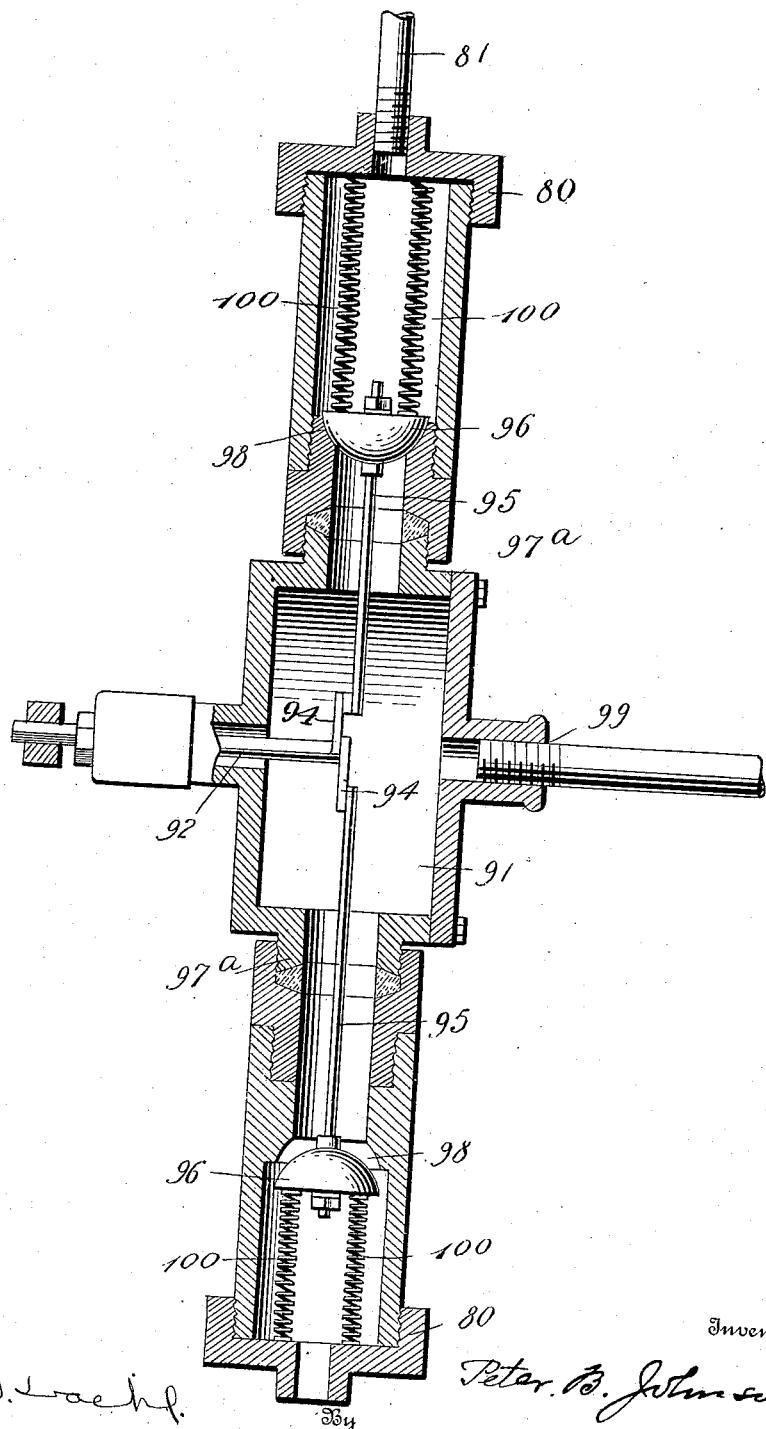

PETER B. JOHNSON, OF CHICAGO, ILLINOIS, ASSIGNOR OF ONE-HALF TO JAMES R. CRAIG, OF THAYER, INDIANA.

VALVE.

No. 890,862.  Specification of Letters Patent.  Patented June 16, 1908.

Application filed November 24, 1906. Serial No. 344,879.

*To all whom it may concern:*

Be it known that I, PETER B. JOHNSON, citizen of the United States, residing at Chicago, in the county of Cook and State of Illinois, have invented new and useful Improvements in Valves, of which the following is a specification.

This invention is a valve particularly adapted for use in connection with the regulating devices of gas machines, but not in any way limited thereto, since it may be applied to various purposes where a three-way valve, or valve having three ports, is desirable or useful.

The valve comprises a casing having two opposite branches, in each of which is a valve head having rods connected to a central crank having two arms which project from the valve stem. The valve disks or heads are so arranged that when one is closed the other is opened. The third opening or outlet from the casing is open at all times, hence the valve is particularly useful where it is desirable to permit a flow in either direction through the third port.

The accompanying drawing is a longitudinal section of the valve.

Referring specifically to the drawings, the valve casing has a central circular chamber 91 in which the valve stem 92 extends at the center thereof. This stem may be provided with any desirable means for turning the same. Within the casing the stem has two crank arms 94, to which are attached rods 95 which extend in opposite directions and are provided at the ends with valve disks 96 located in tubular barrels 97 screwed on to nipples 97ª which project from opposite sides of the central chamber 91. The disks close against valve seats 98 in said barrels. Each barrel is connected at its outer end by means of a suitable coupling 80, with a pipe 81. The third port or opening 99 is located in the chamber 91 between the disk valves just described. When the stem 92 is turned one way one disk 96 is opened and the other one is closed, the port 99 remaining open at all times for the flow desired.

Springs 100 are employed as a means for tightly closing the disks against their seats and preventing jumping or vibration thereof, these springs being located between the disks and the ends of the barrels and bearing against the disks so that the valve is always thrown full, one way or the other.

I claim:

A valve comprising a casing having ports at opposite ends and a third port therebetween, a valve stem having crank arms within the casing, disks arranged to open and close the ports at said opposite ends of the casing, said disks being connected to the cranks and springs bearing behind the disks.

In testimony whereof I have signed my name to this specification in the presence of two subscribing witnesses.

PETER B. JOHNSON.

Witnesses:
RICHARD W. MORRISON,
MARY E. BLACK.